Jan. 5, 1954  R. J. MILLER  2,665,175
TRACK LAYING FRONT WHEEL FOR TRICYCLE TRACTORS
Filed May 17, 1952  2 Sheets-Sheet 1
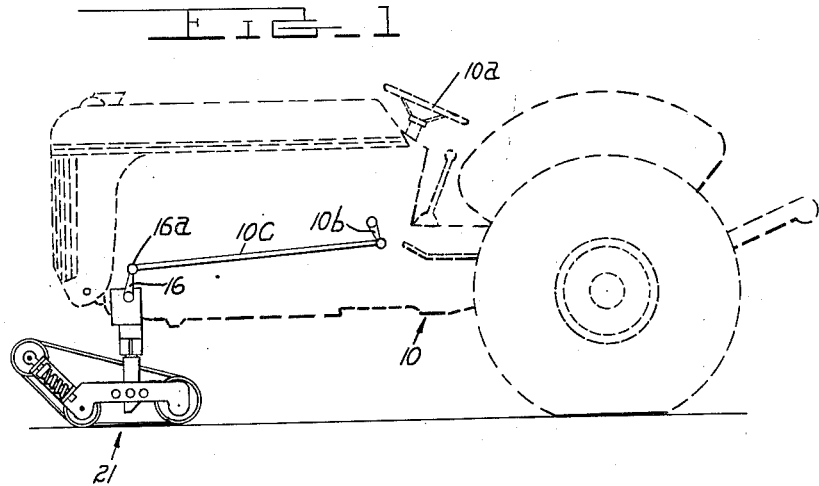
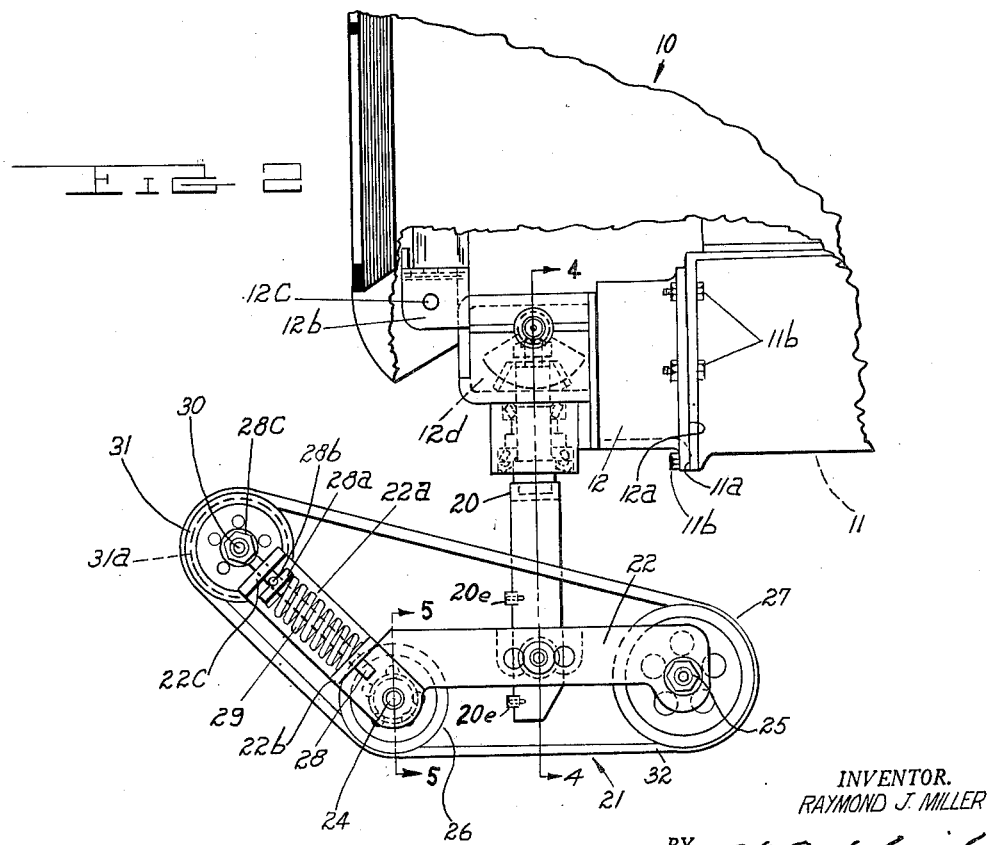
INVENTOR.
RAYMOND J. MILLER
BY W. A. Schaich
AND H. P. Settle, Jr.
ATTORNEYS Jan. 5, 1954 R. J. MILLER 2,665,175
TRACK LAYING FRONT WHEEL FOR TRICYCLE TRACTORS
Filed May 17, 1952 2 Sheets-Sheet 2
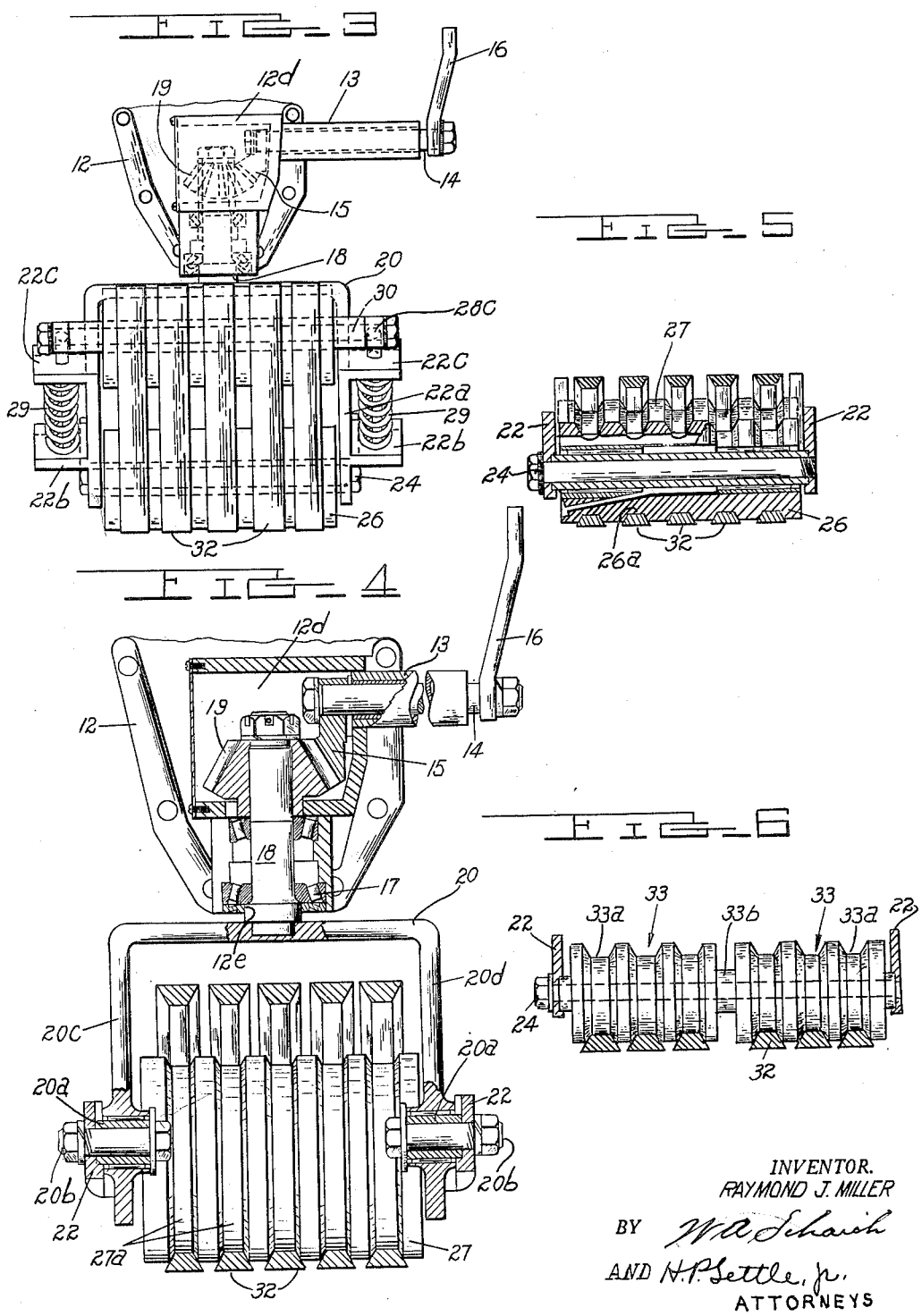
INVENTOR.
RAYMOND J. MILLER Patented Jan. 5, 1954

2,665,175

UNITED STATES PATENT OFFICE 2,665,175

TRACK-LAYING FRONT WHEEL FOR TRICYCLE TRACTORS

Raymond J. Miller, Detroit, Mich., assignor to Dearborn Motors Corporation, Birmingham, Mich., a corporation of Delaware Application May 17, 1952, Serial No. 288,414

1 Claim. (Cl. 305—9)

This invention relates to a tricycle front wheel attachment for conveniently converting agricultural tractors of the four-wheel type to a tricycle having a central front, steerable, ground engaging element.

While it is recognized that a four wheel tractor provides the utmost in stability and maneuverability for heavy tillage operations, there is always a recognized need for a tricycle type tractor having a centrally disposed front steerable ground engaging element to better adapt the tractor for cultivating operations and similar operations wherein the tractor must pass through rows of growing crops. Accordingly, there has been a definite need for an economical front steerable element which can be conveniently substituted for the laterally spaced two wheel steering arrangement of a conventional four wheel tractor. Additionally, there is a need for a front steerable element for a tricycle tractor which will more efficiently travel over the ridges and depressions normally found in cultivated fields without affecting the steering of the tractor or requiring an excess amount of power to traverse such non-uniform ground surface due to the tendency of the conventional wheel to bury itself in loose soil.

Accordingly, it is an object of this invention to provide an economical, steerable, ground-engaging element for supporting the front end of the tractor which may be conveniently applied to a conventional four wheel tractor to convert such into a tricycle or cultivating type of tractor.

Still another object of this invention is to provide a steerable endless belt bogie to function as the steerable ground-engaging element for the front end of a tractor.

The specific nature of this invention, as well as other objects and advantages thereof, will become apparent to those skilled in the art from the following detailed description taken in conjunction with the attached drawings on which, by way of preferred example only, is illustrated two embodiments of this invention.

On the drawings:

Figure 1 is a side elevational view of a conventional tractor having a front steering element embodying this invention assembled thereto;

Figure 2 is an enlarged scale side elevational view of the front end of the tractor of Figure 1 with portions thereof broken away for clarity of illustration;

Figure 3 is a front elevational view of the endless belt steerable bogie embodying this invention;

Figure 4 is an enlarged scale sectional view taken on the plane 4—4 of Figure 2;

Figure 5 is a sectional view taken on the plane 5—5 of Figure 2; and

Figure 6 is a front elevational view of a modified pulley construction.

As shown on the drawings:

The numeral 10 represents the well-known Ford tractor which ordinarily is supplied with a pair of laterally spaced front wheels (not shown) which are steered by a steering wheel 10a operating through a suitable steering gear (not shown) and steering crank arms 10b and radius rods 10c. Such tractor is also conventionally provided with a vertical mounting face 11a at the lower forward edge of the tractor engine housing 11.

In accordance with this invention, the conventional front axle mounting bracket which ordinarily is bolted to the mounting flange 11a is entirely removed and a specially constructed housing 12 is provided in its place, such housing having a face 12a at the rear end thereof shaped to abut and conform to the tractor engine mounting face 11a and securable thereto by a plurality of bolts 11b. The housing 12 is provided at its front end with a bracket portion 12b which is apertured, as indicated at 12c, to receive the bolts which conventionally support the sheet metal hood elements 10d of the tractor.

The housing 12 defines in its central portion a gear chamber 12d. A bushing 13 is rigidly secured to the side of gear chamber 12d in horizontal transverse relationship and a shaft 14 is journaled in bushing 13 and projects into the interior of gear chamber 12d where it mounts a bevel gear sector 15. The outer end of shaft 14 has a crank arm 16 secured thereto and such crank arm is connected by conventional ball joint 16a to the end of the drag link 10c of the conventional tractor steering mechanism. The drag link normally provided on the opposite side of the tractor is removed.

The bottom wall of gear chamber 12d is provided with a vertical bore 12e in which is mounted suitable antifriction bearing elements 17 to journal a stub shaft 18. The top end of stub shaft 18 has a bevel gear 19 secured thereto which meshes with the sector bevel gear 15. The lower end of stub shaft 18 is rigidly secured to an inverted U-shaped supporting yoke 20, which has vertical arms 20c and 20d mounting an endless belt type bogie unit 21 constructed in accordance with this invention.

The bogie unit 21 comprises a pair of laterally spaced, longitudinally extending sill members 22 which have mounted therebetween in transverse relationship a front pulley shaft 24 and a rear pulley shaft 25. The sill members are respectively pivotally supported on the depending arms of yoke 20 by bearing bushings 20a and retaining bolts 20b so that the entire bogie unit 21 can pivot in a longitudinal vertical plane with respect to the tractor. Suitable stops 20e are rigidly attached to each of the depending arms 20c and 20d of yoke 20 to limit both the clockwise and counterclockwise range of pivotal movement of the sills 22.

The shafts 24 and 25 respectively mount drum-like pulley elements 26 and 27, each of which is provided with a plurality of laterally spaced V-grooves 26a and 27a. At the front end of each of the sills 22 a forwardly and upwardly projecting bracket 22a is provided and such bracket in turn has a pair of longitudinally spaced, laterally projecting ears 22b and 22c formed thereon. A rod-like support 28 is slidably mounted in suitable aligned holes provided on the ears 22b and 22c and such support rods are resiliently biased in a forward direction by springs 29 which respectively surround the rods 28 and operate between the ears 22b and a washer 28a secured to the rod 28 by a transverse pin 28b. The forward ends of each of the rods 28 defines an eye portion 28c between which is mounted an idler pulley shaft 30. A drum-like idler pulley 31 having a plurality of laterally spaced V-grooves 31a formed thereon is mounted on idler pulley shaft 30. A plurality of V-belts 32 are then mounted in surrounding relationship to the pulleys 26 and 27 and 31 and are respectively disposed in the V-grooves 26a, 27a, and 31a. The bottom flights of the V-belts 32 which are disposed between the pulleys 26 and 27 normally provide a ground engaging element and all of the belts 32 are maintained in a tensioned condition through the biasing action of the springs 29 operating on the idler pulley 31.

In Figure 6 there is shown a modified pulley construction. Such modification comprises mounting a pair of identical pulleys 33 on the shaft 24 between the sills 22. The pulleys 33, of the same diameter as pulleys 26, are respectively provided with laterally spaced V-grooves 33a. Pulleys 33 are transversely separated by an antifriction washer 33b. When using the pulley construction shown in Figure 6, it will, of course, be necessary to replace the pulleys 27 and 31 with a paired pulley arrangement similar to pulleys 33. As such pulley arrangements, however, are identical to that shown in Figure 6, further description is not believed necessary. The V-belts 32 are trained over pulleys 33 within the V-grooves 33a and the other pulleys (not shown) which correspond to pulleys 27 and 31.

When the bogie unit is equipped with pulleys constructed in accordance with the modification shown in Figure 6, the steerability of such unit is somewhat improved. As the bogie unit is turned about its vertical axis, the lateral displacement of such unit causes the inner set of V-belts 32 on the inner set of pulleys nearest to the center of the radius of the turn to revolve at a slower rate than the outer set of belts and pulleys. This differential action thereby facilitates turning of the bogie unit.

The forward and upward inclination of that portion of the flights of the belts 32 lying between the idler pulley 21 and ground pulley 26, coupled with the fact that the entire bogie unit 21 may pivot in a longitudinal vertical plane with respect to the tractor, permits the bogie unit 21 to traverse rough terrain without excessive power consumption. Furthermore, due to the number of belts 32 provided and their lateral spacing, it is apparent that there is a large surface area of the endless belt bogie unit always in engagement with the ground, and hence, even in the soft or sandy soils, there will be far less tendency of the bogie unit to sink into the ground than would be encountered with any conventional wheel.

From the foregoing description, it is apparent that this invention provides a single front steerable supporting element which may be conveniently applied to conventional types of four wheel tractors. Furthermore, the bogie unit provided by this invention permits effective steering of the tractor to be accomplished over rough terrain or soft ground with minimum energy requirements.

It will of course, be understood that many details of construction may be varied through a wide range without departing from the principles of this invention and it is, therefore, not the purpose to limit the patent granted hereon otherwise than necessitated by the scope of the appended claim.

I claim:

An endless track wheel for tractors comprising a frame structure including a pair of laterally spaced, longitudinal frame sills, a pair of axles mounted between said frame sills in longitudinally spaced relation, a plurality of V-belt pulley structures respectively journalled on each axle with their pulley grooves in axial alignment, a plurality of V-belts respectively entrained around said pulley structures, a pair of brackets respectively secured to said frame sills in forwardly and upwardly projecting relationship, a pair of laterally outwardly projecting, longitudinally spaced ears on each bracket, said ears having longitudinally aligned holes therein, a rod slidably journalled in each pair of holes, a transverse axle carried by the forward ends of said rods, a plurality of V-belt idler pulleys journalled on said axle and respectively engageable with said V-belts, a spring seat secured to each rod at a point intermediate said ears, and a compression spring surrounding each rod and operating between said spring seat and the rearmost ear to urge the corresponding rod forwardly, thereby tensioning said V-belts.

RAYMOND J. MILLER.

References Cited in the file of this patent

UNITED STATES PATENTS

| Number | Name | Date |
|---|---|---|
| 2,277,855 | Mercier | Mar. 31, 1942 |
| 2,301,152 | Strehlow | Nov. 3, 1942 |
| 2,416,679 | Curtis | Mar. 4, 1947 |
| 2,613,892 | Dever | Oct. 14, 1952 |

FOREIGN PATENTS

| Number | Country | Date |
|---|---|---|
| 980,237 | France | Dec. 20, 1950 |